(12) United States Patent
Kikuchi et al.

(10) Patent No.: US 10,951,313 B2
(45) Date of Patent: Mar. 16, 2021

(54) TRANSMITTING DEVICE, TRANSMISSION METHOD, AND RECORDING MEDIUM

(71) Applicant: CASIO COMPUTER CO., LTD., Tokyo (JP)

(72) Inventors: Masaaki Kikuchi, Fussa (JP); Taichi Murakami, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/675,045

(22) Filed: Nov. 5, 2019

(65) Prior Publication Data
US 2020/0177279 A1    Jun. 4, 2020

(30) Foreign Application Priority Data
Nov. 30, 2018 (JP) .............................. JP2018-224447

(51) Int. Cl.
| H04B 10/50 | (2013.01) |
| H04B 10/116 | (2013.01) |
| H04B 10/572 | (2013.01) |
| G08C 23/04 | (2006.01) |

(52) U.S. Cl.
CPC .......... *H04B 10/116* (2013.01); *G08C 23/04* (2013.01); *H04B 10/502* (2013.01); *H04B 10/572* (2013.01)

(58) Field of Classification Search
CPC .. H04B 10/116; H04B 10/572; H04B 10/502; G08C 23/04
See application file for complete search history.

(56) References Cited

U.S. PATENT DOCUMENTS

| 8,838,187 | B2 * | 9/2014 | Zhao | G01R 31/382 |
| | | | | 455/574 |
| 2007/0205908 | A1 * | 9/2007 | Du | G08B 5/36 |
| | | | | 340/636.1 |
| 2017/0118714 | A1 * | 4/2017 | Kaechi | H04B 5/0087 |
| 2018/0102002 | A1 * | 4/2018 | Ohta | B60K 35/00 |
| 2019/0305597 | A1 * | 10/2019 | Venkatraman | H02J 50/80 |

FOREIGN PATENT DOCUMENTS

| JP | WO2003-036829 A1 | 2/2005 |
| JP | 2009-176674 A | 8/2009 |
| JP | 2015-233276 A | 12/2015 |

* cited by examiner

*Primary Examiner* — Dzung D Tran
(74) *Attorney, Agent, or Firm* — Fitch, Even, Tabin & Flannery LLP (57) ABSTRACT

A remaining battery capacity measuring device within a control device of a mobile apparatus measures a remaining battery capacity level of a battery. The light-emission control device, in a period separate from a transmission period for transmitting an ID, in accordance with the remaining charge amount of the battery, performs changing of a hue of light emitted by an LED, and setting no-data and a no-data period. Alternatively, the light-emission control device, in the period separate from the transmission period for transmitting the ID, in reaction to the remaining battery capacity level of the battery, changes a luminosity of the light emitted by the LED.

12 Claims, 9 Drawing Sheets

TRANSMITTING DEVICE, TRANSMISSION METHOD, AND RECORDING MEDIUM

CROSS-REFERENCE TO RELATED APPLICATION

This application claims the benefit of Japanese Patent Application No. 2018-224447, filed on Nov. 30, 2018, the entire disclosure of which is incorporated by reference herein.

FIELD

The present disclosure relates to a transmitting device, a transmission method, and a recording medium.

BACKGROUND

A battery-driven-type transmitting device using visible light transmission exists heretofore, as described in Unexamined Japanese Patent Application Kokai Publication No. 2009-176674.

SUMMARY

A transmitting device according to the present disclosure is a transmitting device including a light emitter and a processor. The processor is configured to transmit information to be transmitted by causing the light emitter to emit light, at a first light-emission timing, corresponding to the information to be transmitted that is set in advance in the transmission device, acquire a state of the transmitting device, and control the light emitter to emit light, at a second light-emission timing different from the first light-emission timing, corresponding to information of the acquired state of the transmitting device.

A transmission method according to the present disclosure includes: transmitting information to be transmitted by causing a light emitter to emit light, at a first light-emission timing, corresponding to information to be transmitted that is set in advance in the transmission device; acquiring a state of a transmitting device that comprises the light emitter; and controlling the light emitter to emit light, at a second light-emission timing different from the first light-emission timing, corresponding to information of the acquired state of the transmitting device.

A non-transitory computer-readable recording medium of the present disclosure records a program for causing a computer included in a transmitting device to function as: transmission means for transmitting information to be transmitted by causing a light emitter included in the transmitting device to emit light, at a first light-emission timing, corresponding to the information to be transmitted that is set in advance in the transmission device; acquisition means for acquiring a state of the transmitting device; and control means for controlling the light emitter to emit light, at a second light-emission timing different from the first light-emission timing, corresponding to information of the state of the transmitting device acquired by the acquisition means.

BRIEF DESCRIPTION OF THE DRAWINGS

A more complete understanding of this application can be obtained when the following detailed description is considered in conjunction with the following drawings, in which.

DETAILED DESCRIPTION

Embodiment

A visible light communication system as an information processing system according to an embodiment of the present disclosure is described below with reference to drawings.

Figure 1:
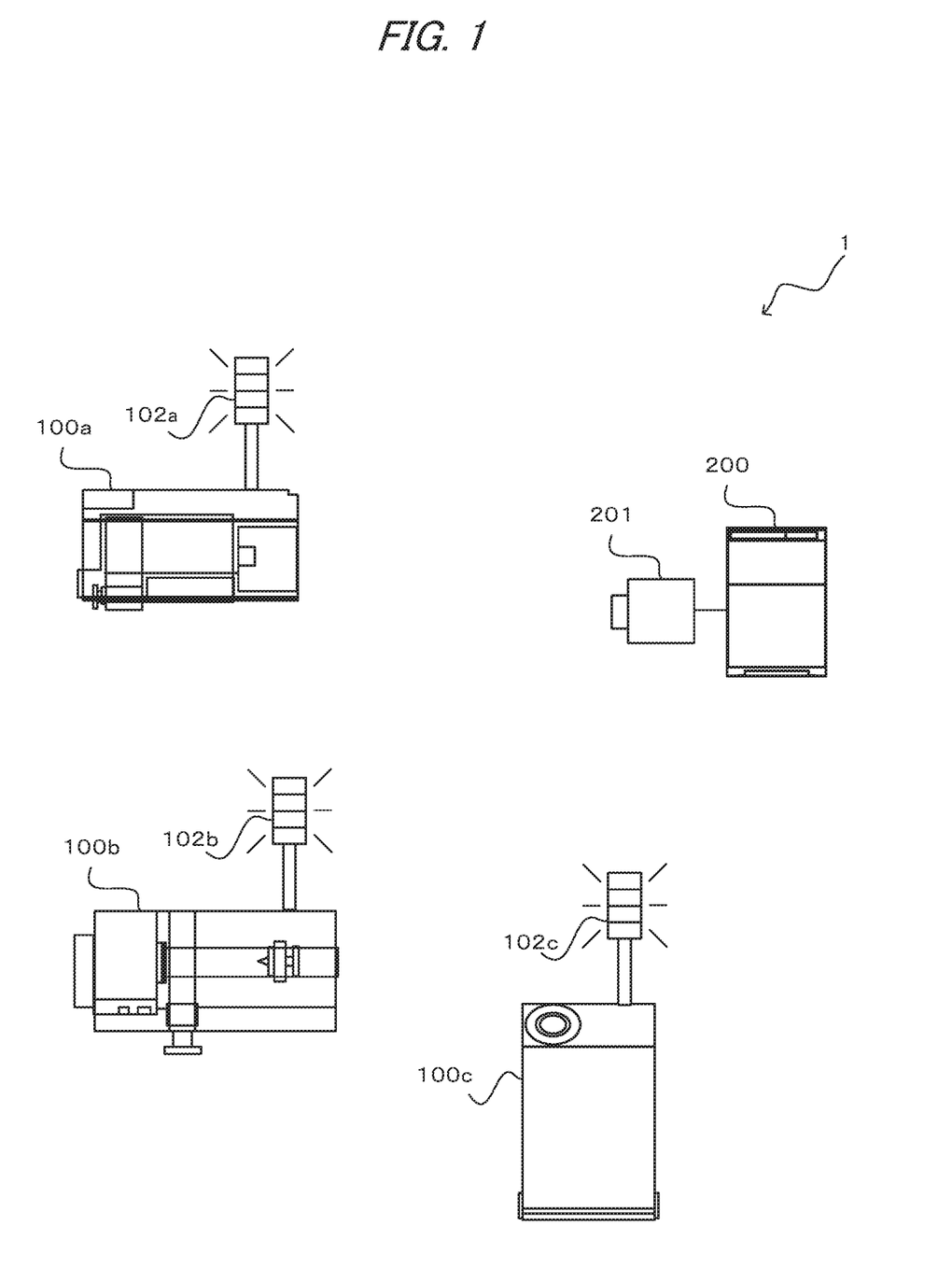
FIG. 1 illustrates an example of a visible light communication system according to an embodiment of the present disclosure.

FIG. 1 illustrates configuration of the visible light communication system. As illustrated in FIG. 1, a visible light communication system 1 includes mobile apparatuses 100a, 100b, and 100c, that are each suitably abbreviated as a "mobile apparatus 100" when not limited to a given mobile apparatus 100a, 100b, or 100c, and a server 200. The mobile apparatus 100a includes a light emitting diode (LED) 102a that is a marker, the mobile apparatus 100b includes an LED 102b, and the mobile apparatus 100c includes an LED 102c, that each are suitably abbreviated as "LED 102" when not limited to a given LED 102a, 102b, or 102c. The server 200 includes an imager 201. The mobile apparatus 100 corresponds to a transmitting device.

In the present disclosure, the mobile apparatus 100 modulates the ID (Identification) of the mobile apparatus 100, which is information to be transmitted, to a preset unique combination of red (R), green (G), and blue (B).

Then, the mobile apparatus 100 transmits the ID as information by causing the LED 102 to emit light with a light emission pattern formed from the modulated result. On the other hand, in the server 200, the imager 201 in the server 200 sequentially captures images. Then, a light emission pattern consisting of a unique combination of the mobile apparatus 100 is acquired from a plurality of images obtained by sequentially capturing images, and the ID is acquired by demodulating the light emission pattern.

Figure 2:
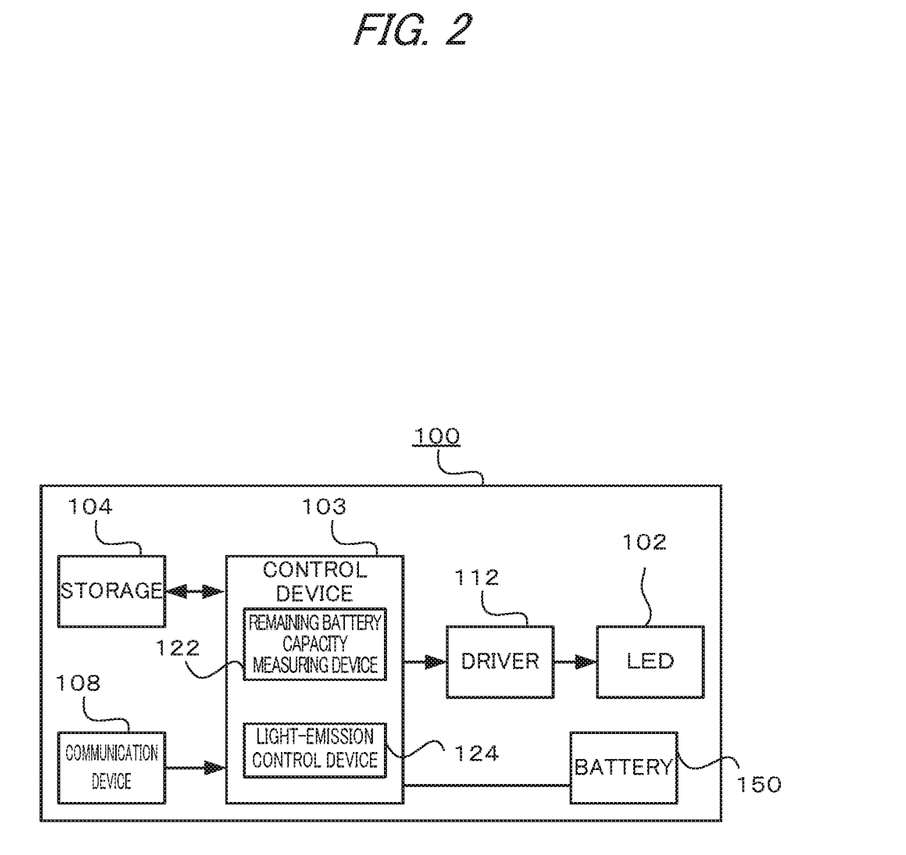
FIG. 2 illustrates an example of configuration of a mobile apparatus according to the same embodiment.

FIG. 2 illustrates an example of configuration of the mobile apparatus 100. As illustrated in FIG. 2, the mobile apparatus 100 includes the LED 102, a control device 103, a storage 104, a communication device 108, a driver 112, and a battery 150.

The control device 103 includes a central processing unit (CPU), for example. The control device 103 is a processor and controls various types of functions with which the mobile apparatus 100 is equipped, by executed software processing in accordance with a program stored in the storage 104, such as a program for achievement of operations of the mobile apparatus 100 illustrated in a below-described FIG. 6.

The storage 104, for example, is random access memory (RAM) and/or read only memory (ROM). The storage 104 stores various types of information, such as programs, used in operations, such as control, performed by the mobile apparatus 100. The communication device 108, for example, is a local area network (LAN) card. The communication device 108 performs communication with another communication device. The battery 150 supplies to various components power to be used for operation of the mobile apparatus 100.

The control device 103 includes a remaining battery capacity measuring device 122 and a light-emission control device 124. The remaining battery capacity measuring device 122 measures a remaining battery capacity level of the battery 150. The light-emission control device 124 determines a light-emission pattern for emission of prescribed light that includes freely-selected information modulated to change time-wise in hue and emitted by the LED 102 to correspond to the ID and the remaining battery capacity level of the mobile apparatus 100.

Figure 3:
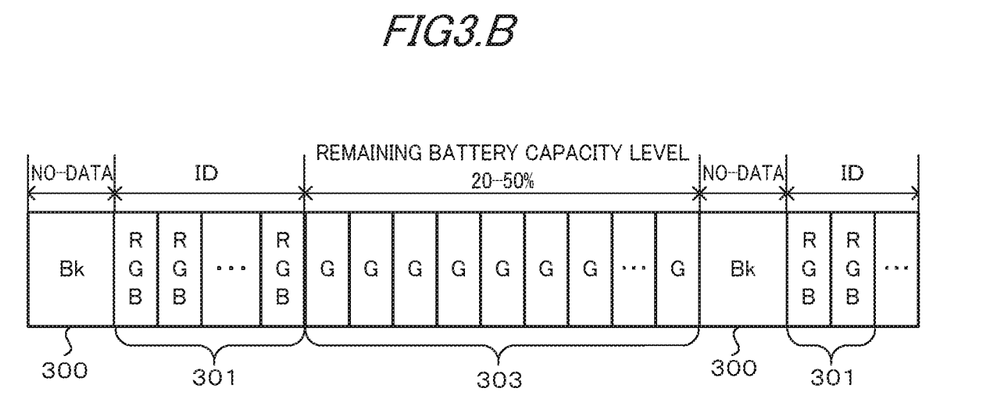
FIG. 3A illustrates an example of a first light-emission pattern according to the same embodiment, in a case in which a remaining battery capacity level is at least 50%.
FIG. 3B illustrates an example of the first light-emission pattern according to the same embodiment, in a case in which the remaining battery capacity level is at least 20% and less than 50%.
FIG. 3C illustrates an example of the first light-emission pattern according to the same embodiment, in a case in which the remaining battery capacity level is at least 10% and less than 20%.
FIG. 3D illustrates an example of the first light-emission pattern according to the same embodiment, in a case in which the remaining battery capacity level is at least 5% and less than 10%.
FIG. 3E illustrates an example of the first light-emission pattern according to the same embodiment, in a case in which the remaining battery capacity level is less than 5%.
Figure 3A:
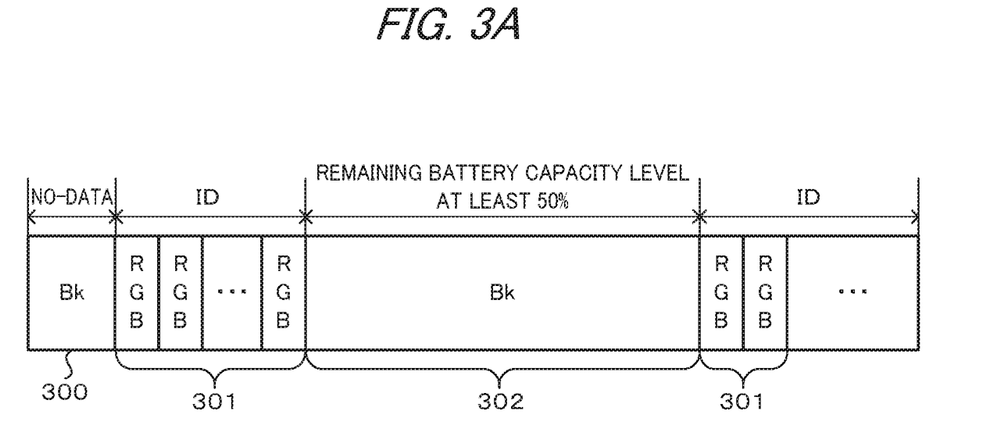

In the present embodiment, a first light-emission pattern and a second light-emission pattern are adopted. FIG. 3 illustrates an example of the first light-emission pattern. Five patterns of FIGS. 3A to 3E are illustrated for the first light-emission pattern, corresponding to remaining battery capacity levels. The first light-emission pattern of FIG. 3A illustrates a case in which the remaining battery capacity level is at least 50%. The first light-emission pattern illustrated in FIG. 3A includes: a no-data (non-communication) period (turn-off "Bk") 300 as a header for synchronization, a light-emission period 301 in which light is emitted in a light-emission mode that cyclically emits light by combining red (R), green (G), and blue (B) to correspond to the ID, and a no-data period (turn-off "Bk") 302 indicating that the remaining battery capacity level is at least 50%. The no-data period 302 exists when the remaining battery capacity level is at least 50%, that is, when the state is normal, and is used when sending notification of the remaining battery capacity level is not required. Then after the no-data period 302, light emission repeats with the light-emission period 301.

The first light-emission pattern illustrated in FIG. 3B is used in a case in which the remaining battery capacity level is at least 20% and less than 50%. The first light-emission pattern illustrated in FIG. 3B includes: the no-data period 300 as the header, the light-emission period 301, and a light-emission period 303 in which green indicates that the remaining battery capacity level is at least 20% and less than 50%. Length of the green light-emission period 303 indicating that the remaining battery capacity level is at least 20% and less than 50% is the same as the length of the no-data period 302 illustrated in FIG. 3A indicating that the remaining battery capacity level is at least 50%. After the emission of light in the light-emission period 303, the light-emission mode of the no-data period 300 as the header and beyond is repeated.

Figure 3C:
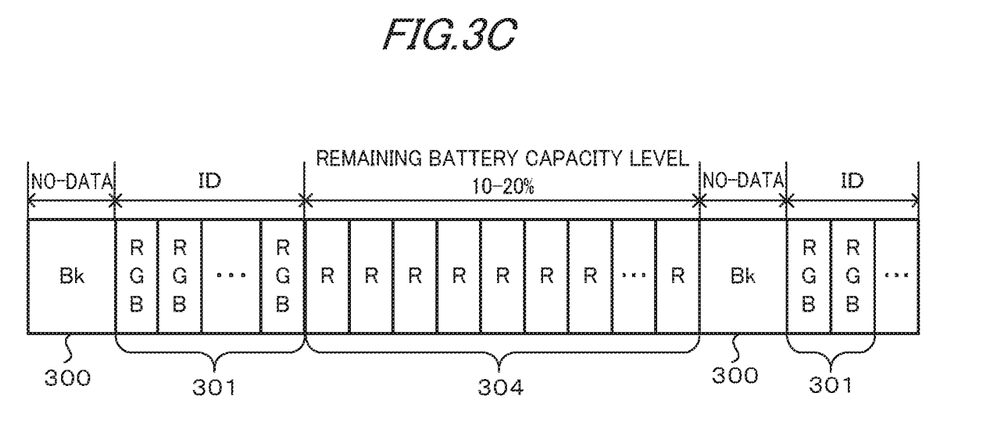

The first light-emission pattern illustrated in FIG. 3C is used in a case in which the remaining battery capacity level is at least 10% and less than 20%. The first light-emission pattern illustrated in FIG. 3C includes: the no-data period 300 as the header, the light-emission period 301, and a light-emission period 304 in which red indicates that the remaining battery capacity level is at least 10% and less than 20%. Length of the red light-emission period 304 indicating that the remaining battery capacity level is at least 10% and less than 20% is the same as the length of the no-data period 302 illustrated in FIG. 3A indicating that the remaining battery capacity level is at least 50%. After the emission of light in the light-emission period 304, the light-emission mode of the no-data period 300 as the header and beyond is repeated.

Figure 3D:
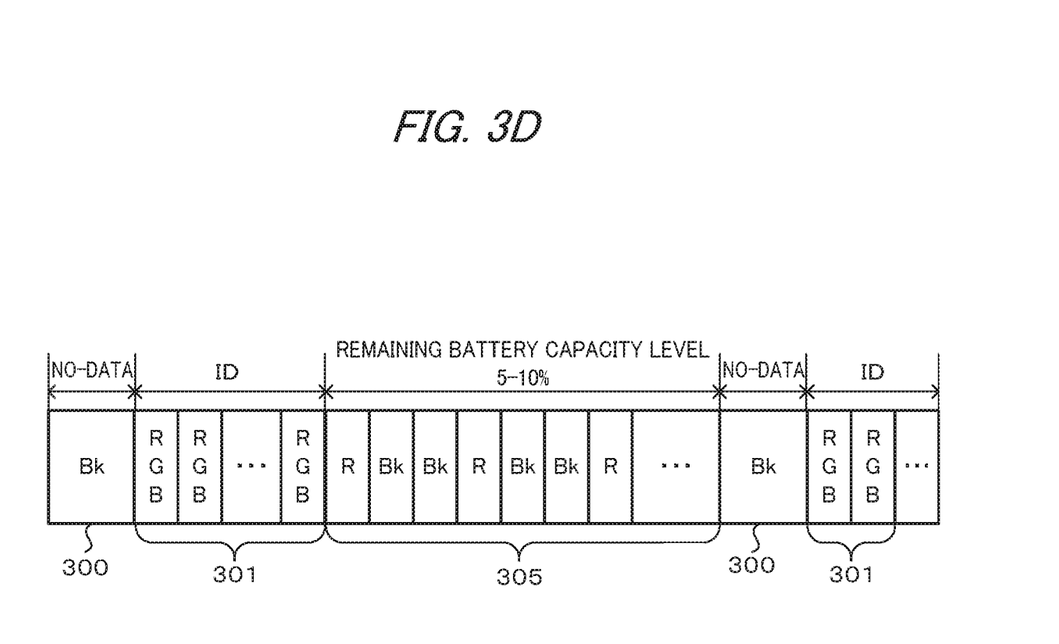

The first light-emission pattern illustrated in FIG. 3D is used in a case in which the remaining battery capacity level is at least 5% and less than 10%. The first light-emission pattern illustrated in FIG. 3D includes: the no-data period 300 as the header, the light-emission period 301, and a blinking period 305 in which red indicates that the remaining battery capacity level is at least 5% and less than 10%. Length of the red blinking period 305 indicating that the remaining battery capacity level is at least 5% and less than 10% is the same as the length of the no-data period 302 illustrated in FIG. 3A indicating that the remaining battery capacity level is at least 50%. After the blinking period 305, the light-emission mode of the no-data period 300 as the header and beyond is repeated.

The first light-emission pattern illustrated in FIG. 3E is used in a case in which the remaining battery capacity level is at less than 5%. The first light-emission pattern illustrated in FIG. 3E includes: the no-data period 300 as the header, the light-emission period 301, and a no-data period 306 indicating that the remaining battery capacity level is less than 5%. The no-data period 306 is a period obtained by adding together the no-data period 302 indicating that the remaining battery capacity level is at least 50% as illustrated in FIG. 3A and the no-data period 300 as the header, and has the effect of suppressing power consumption as much as possible. After the no-data period 306, the light-emission mode of the light-emission period 301 and beyond is repeated.

FIG. 4 illustrates an example of a second light-emission pattern. For the second light-emission pattern, four patterns exist as FIGS. 4A to 4D corresponding to the remaining battery capacity level. The second light-emission pattern illustrated in FIG. 4A illustrates the case in which the remaining battery capacity level is at least 50%. The second light-emission pattern illustrated in FIG. 4A includes: the no-data period (turn-off "Bk") 300 as the header, the light-emission period 301 in which light is emitted in a light-emission mode that cyclically emits light by combining red (R), green (G), and blue (B) to correspond to the ID, and the no-data period (turn-off "Bk") 302 indicating that the remaining battery capacity level is at least 50%. The no-data period 302 exists when the remaining battery capacity level is at least 50%, that is, when the state is normal, and is used when sending notification of the remaining battery capacity level is not required. Then after the no-data period 302, light emission repeats with the light-emission period 301.

Figure 4A:
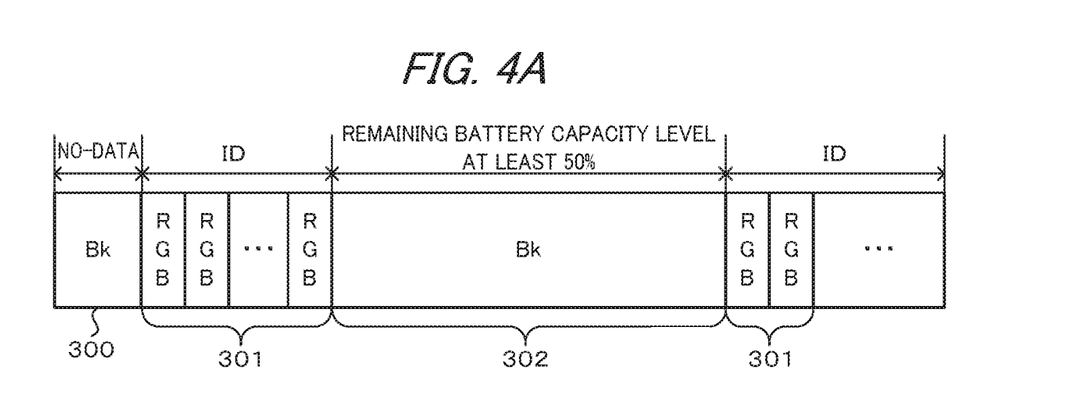
FIG. 4A illustrates an example of a second light-emission pattern according to the same embodiment, in a case in which a remaining battery capacity level is at least 50%.
Figure 4B:
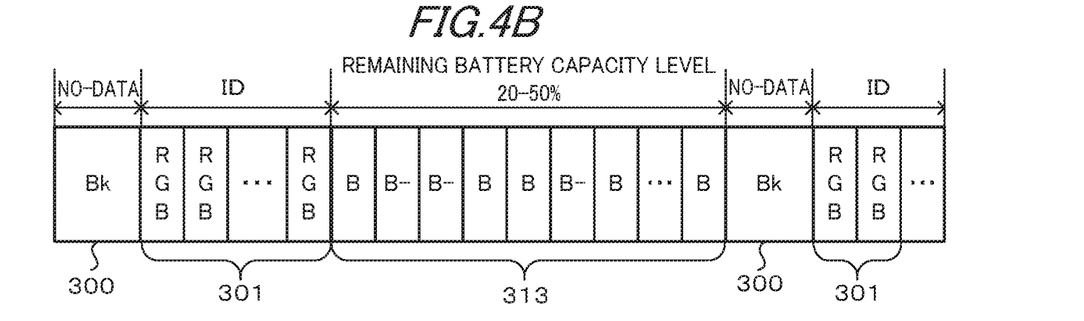
FIG. 4B illustrates an example of the second light-emission pattern according to the same embodiment, in a case in which the remaining battery capacity level is at least 20% and less than 50%.

The second light-emission pattern illustrated in FIG. 4B is used in a case in which the remaining battery capacity level is at least 20% and less than 50%. The second light-emission pattern illustrated in FIG. 4B includes: the no-data period 300 as the header, the light-emission period 301, and a light-emission period 313 in which blue luminosity modulation indicates that the remaining battery capacity level is at least 20% and less than 50%. The light-emission period 313 intermixes and repeats a state (B) in which luminosity is high, and a state (B−) in which luminosity is low. Length of the light-emission period 313 is the same as the length of the no-data period 302 illustrated in FIG. 4A indicating that the remaining battery capacity level is at least 50%. After the emission of light in the light-emission period 313, the light-emission mode of the no-data period 300 as the header and beyond is repeated.

Figure 4C:
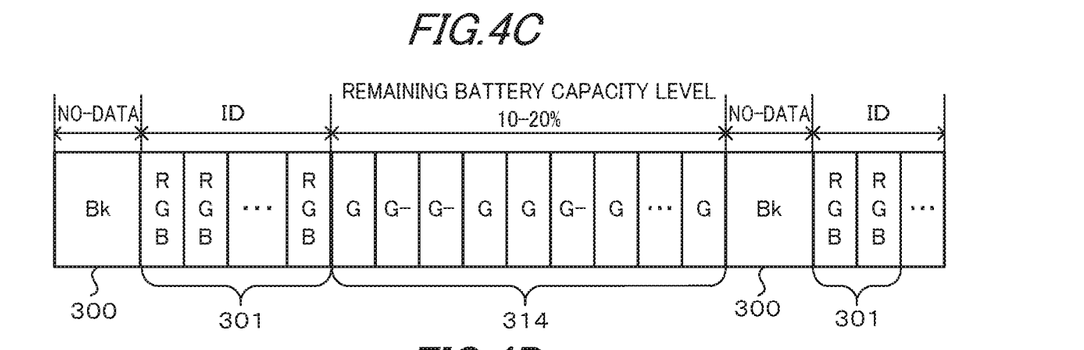
FIG. 4C illustrates an example of the second light-emission pattern according to the same embodiment, in a case in which the remaining battery capacity level is at least 10% and less than 20%.

The second light-emission pattern illustrated in FIG. 4C is used in a case in which the remaining battery capacity level is at least 10% and less than 20%. The second light-emission pattern illustrated in FIG. 4C includes: the no-data period 300 as the header, the light-emission period 301, and a light-emission period 314 in which green luminosity modulation indicates that the remaining battery capacity level is at least 10% and less than 20%. The light-emission period 314 intermixes and repeats a state (G) in which luminosity is high, and a state (G−) in which luminosity is low. Length of the light-emission period 314 is the same as the length of the no-data period 302 illustrated in FIG. 4A indicating that the remaining battery capacity level is at least 50%. After the emission of light in the light-emission period 314, the light-emission mode of the no-data period 300 as the header and beyond is repeated.

Figure 4D:
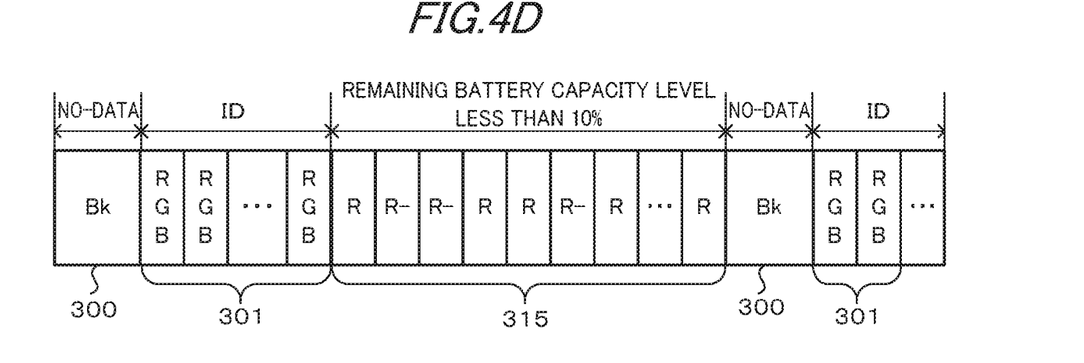
FIG. 4D illustrates an example of the second light-emission pattern according to the same embodiment, in a case in which the remaining battery capacity level is less than 10%.

The second light-emission pattern illustrated in FIG. 4D is used in a case in which the remaining battery capacity level is less than 10%. The second light-emission pattern illustrated in FIG. 4D includes: the no-data period 300 as the header, the light-emission period 301, and a light-emission period 315 in which red luminosity modulation indicates that the remaining battery capacity level is less than 10%. The light-emission period 315 intermixes and repeats a state (R) in which luminosity is high, and a state (R−) in which luminosity is low. Length of the light-emission period 315 is the same as the length of the no-data period 302 illustrated in FIG. 4A indicating that the remaining battery capacity level is at least 50%. After the emission of light in the light-emission period 315, the light-emission mode of the no-data period 300 as the header and beyond is repeated.

The present description is described further with reference again to FIG. 2. The light-emission control device 124 further outputs to the driver 112 information on the light-emission pattern corresponding to the ID and the remaining battery capacity level. In response to the information of the light-emission pattern from the light-emission control device 124, the driver 112 generates a driver signal for causing time-wise change in hue and/or luminosity of light emitted by the LED 102. The LED 102 emits light that changes hue and/or luminosity in a time-wise manner in response to the driver signal output from the driver 112. The user can understand the remaining battery capacity level of the battery 150 within the mobile apparatus by visually checking the light-emission mode corresponding to the remaining battery capacity level.

Figure 5:
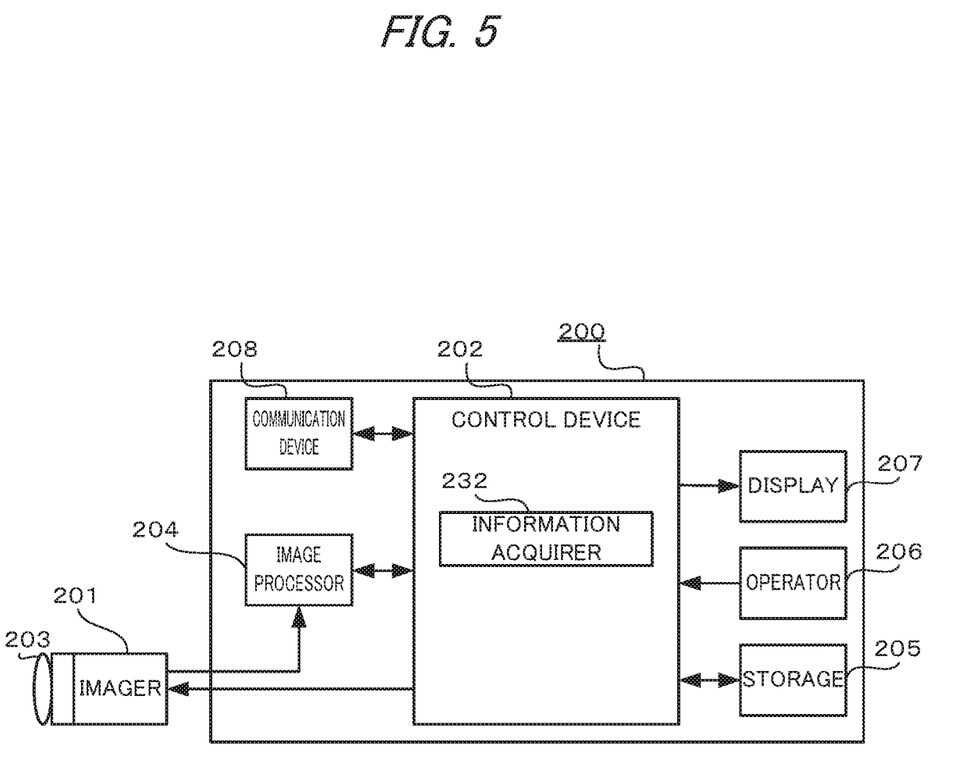
FIG. 5 illustrates an example of configuration of a server according to the same embodiment.

FIG. 5 illustrates an example of configuration of the server 200. As illustrated in FIG. 5, the server 200 includes the imager 201, a control device 202, an image processor 204, a storage 205, an operation device 206, a display 207, and a communication device 208.

The imager 201 includes a lens 203. The lens 203 includes components such as a zoom lens. The lens 203 moves due to a zoom control operation from the operation device 206 and due to focal control by the control device 202. An imaging field angle and/or optical image imaged by the imager 201 is controlled by the movement of the lens 203.

The imager 201 includes multiple light-receiving elements orderly disposed in a two-dimensional array on a light-receiving surface. The light-receiving element is an imaging device such as a charge coupled device (CCD), a complementary metal oxide semiconductor (CMOS), or the like. The imager 201 takes an optical image from light entering through the lens 203 (receives light) in the imaging field angle of a prescribed range on the basis of a control signal from the control device 202, and generates a frame by converting the image signal within the imaged field angle to digital data. Further, the imager 201 continues with the imaging and the frame generation, and outputs the continuing frame to the image processor 204.

On the basis of the control signal from the control device 202, the image processor 204 outputs as is to the control device 202 the frame (digital data) output from the imager 201, and for this frame, outputs to the control device 202 a quality-adjusted and/or size-adjusted image to be displayed as a through image on the display 207. The image processor 204 has functions for, upon input of a control signal based on the command operation from the operation device 206, encoding and file generation from the optical image within the imaging field angle of the imager 201 or in the display range displayed on the display 207 at the time of the command, the encoding and file generation using a compression-encoding format such as the joint photographic experts group (JPEG) format.

The control device 202 includes components such as a CPU. The control device 202 controls various types of functions with which the server 200 is equipped by executing software processing in accordance with programs stored in the storage 205.

The storage 205 is RAM and/or ROM, for example. The storage 205 stores various types of information, such as programs, used in operations such as control by the server 200. The communication device 208 is a device such as a LAN card. The communication device 208 performs communication with an external communication device.

The operation device 206 includes components such as a numeric keypad and/or function keys, and is an interface that is used for input of operational content of a user. The display 207 includes a display such as a liquid crystal display (LCD), a plasma display panel (PDP), an electro-luminescence (EL) display, or the like. The display 207 displays in image in accordance with an image signal output from the control device 202.

The control device 202 includes an information acquirer 232. The information acquirer 232 identifies the light-emission pattern of the LED 102 within the mobile apparatus 100. The information acquirer 232 considers the light emitted by the LED 102 within the mobile apparatus 100 and changing over time in hue by the identified light-emission pattern, and acquires the ID of the mobile apparatus 100 corresponding to the identified light-emission pattern.

Figure 6:
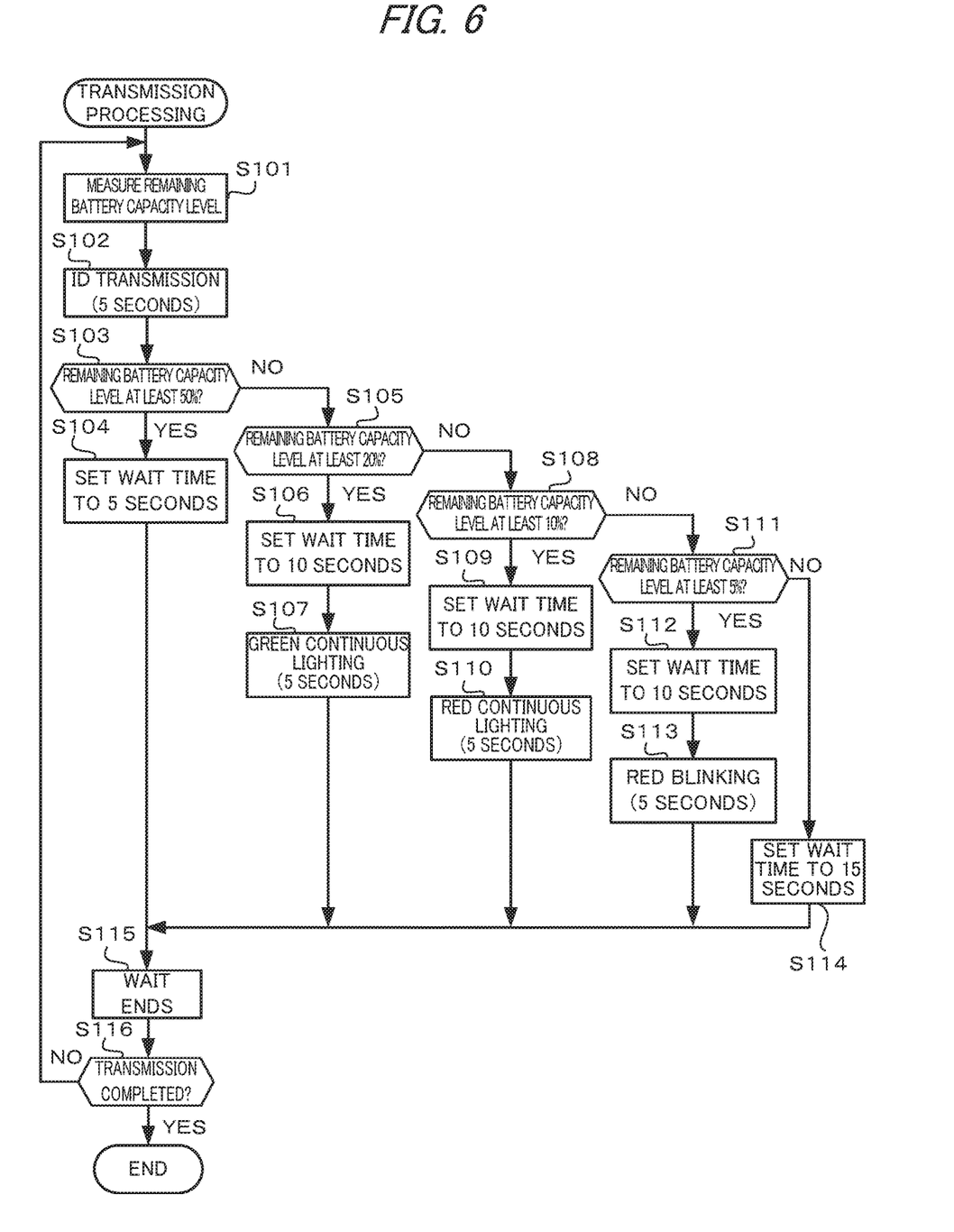
FIG. 6 is a flowchart illustrating an example of operation of transmission processing by the mobile apparatus according to the same embodiment.

Operation of the mobile apparatus 100 is described below. FIG. 6 is a flowchart illustrating an example of operation of the transmission processing of the mobile apparatus 100 within the visible light communication system 1. The operation illustrated in FIG. 6 is an example in which light emission is performed that corresponds to the first light-emission pattern illustrated in FIG. 3.

The remaining battery capacity measuring device 122 within the control device 103 of the mobile apparatus 100 measures the remaining battery capacity level of the battery 150, that is, the remaining battery capacity level (step S101). Thereafter, the light-emission control device 124 within the control device 103 outputs to the driver 112 information of the light-emission pattern corresponding to the ID of the mobile apparatus 100. The driver 112 generates the driver signal in order to cause time-wise change in the hue of the light emitted by the LED 102 corresponding to the information of the light-emission pattern corresponding to the ID from the light-emission control device 124. The LED 102 for 5 seconds generates (ID transmission) light that changes time-wise in hue corresponding to the ID in response to the driver signal output from the driver 112 (step S102).

Thereafter, the light-emission control device 124 determines whether the remaining battery capacity level is at least 50% (step S103). When the remaining battery capacity level is at least 50% (YES in step S103), the light-emission control device 124 sets a wait time to 5 seconds (step S104). At 5 seconds after setting of the wait time in step S104, the wait ends (step S115). The wait of 5 seconds corresponds to the no-data period 302 of 5 seconds indicating that the remaining battery capacity level is at least 50%.

However, when the remaining battery capacity level is not at least 50% (NO in step S103), the light-emission control device 124 determines whether the remaining battery capacity level is at least 20% (step S105). When the remaining battery capacity level is at least 20% (YES in step S105), that is, when the remaining battery capacity level is at least 20% and is less than 50%, the light-emission control device 124 sets the wait time to 10 seconds (step S106).

Further, the light-emission control device 124 outputs to the driver 112 information of the light-emission pattern corresponding to continuous green lighting for 5 seconds indicating that the remaining battery capacity level is at least 20% and less than 50%. The driver 112 generates the driver signal corresponding to the light for emission by the LED 102 in response to the information of the light-emission pattern from the light-emission control device 124. In response to the driver signal output from the driver 112, the LED 102 performs continuous green lighting for 5 seconds that indicates that the remaining battery capacity level is at least 20% and is less than 50% (step S107). Then 10 seconds after step S107, the wait ends (step S115). The 10 second wait corresponds to the no-data period 300 as the header.

However, when the remaining battery capacity level is not at least 20% (NO in step S105), the light-emission control device 124 determines whether the remaining battery capacity level is at least 10% (step S108). When the remaining battery capacity level is at least 10% (YES in step S108), that is, when the remaining battery capacity level is at least 10% and less than 20%, the light-emission control device 124 sets the wait time to 10 seconds (step S109).

Further, the light-emission control device 124 outputs to the driver 112 information of the light-emission pattern corresponding to 5 seconds of continuous red lighting that indicates that the remaining battery capacity level is at least 10% and is less than 20%. The driver 112 generates the driver signal corresponding to light for emission by the LED 102 in response to the information of the light-emission pattern from the light-emission control device 124. In response to the driver signal output from the driver 112, the LED 102 performs 5 seconds of continuous red lighting that indicates that the remaining battery capacity level is at least 10% and is less than 20% (step S110). At 10 seconds after step S110, the wait ends (step S115). The wait of 10 seconds corresponds to the no-data period 300 as the header.

However, when the remaining battery capacity level is not at least 10% (NO in step S108), the light-emission control device 124 determines whether the remaining battery capacity level is at least 5% (step S111). When the remaining battery capacity level is at least 5% (YES in step S111), that is, when the remaining battery capacity level is at least 5% and is less than 10%, the light-emission control device 124 sets the wait time to 10 seconds (step S112).

Further, the light-emission control device 124 outputs to the driver 112 information of the light-emission pattern corresponding to 5 seconds of red blinking that indicates that the remaining battery capacity level is at least 5% and is less than 10%. The driver 112 generates the driver signal corresponding to light for emission by the LED 102 corresponding to the information of the light-emission pattern from the light-emission control device 124. In response to the driver signal output from the driver 112, the LED 102 performs 5 seconds of red blinking that indicates that the remaining battery capacity level is at least 5% and is less than 10% (step S113). Then 10 seconds after step S113, the wait ends (step S115). The wait of 10 seconds corresponds to the no-data period 300 as the header.

However, when the remaining battery capacity level is not at least 5% (NO is step S111), the light-emission control device 124 sets the wait time to 15 seconds (step S114). Then 15 seconds after the setting of the wait time in step S114, the wait sends (step S115). The wait of 15 seconds corresponds to the no-data of 15 seconds that indicates that the remaining battery capacity level is less than 5%.

After the completion of the wait in step S115, the control device 103 determines whether the transmission by the mobile apparatus 100 is completed (step S116). When transmission by the mobile apparatus 100 is completed (YES in step S116), the series of operations ends. However, if the transmission by the mobile apparatus 100 is not completed (NO in step S116), the operations of step S101 and beyond are repeated.

Figure 7:
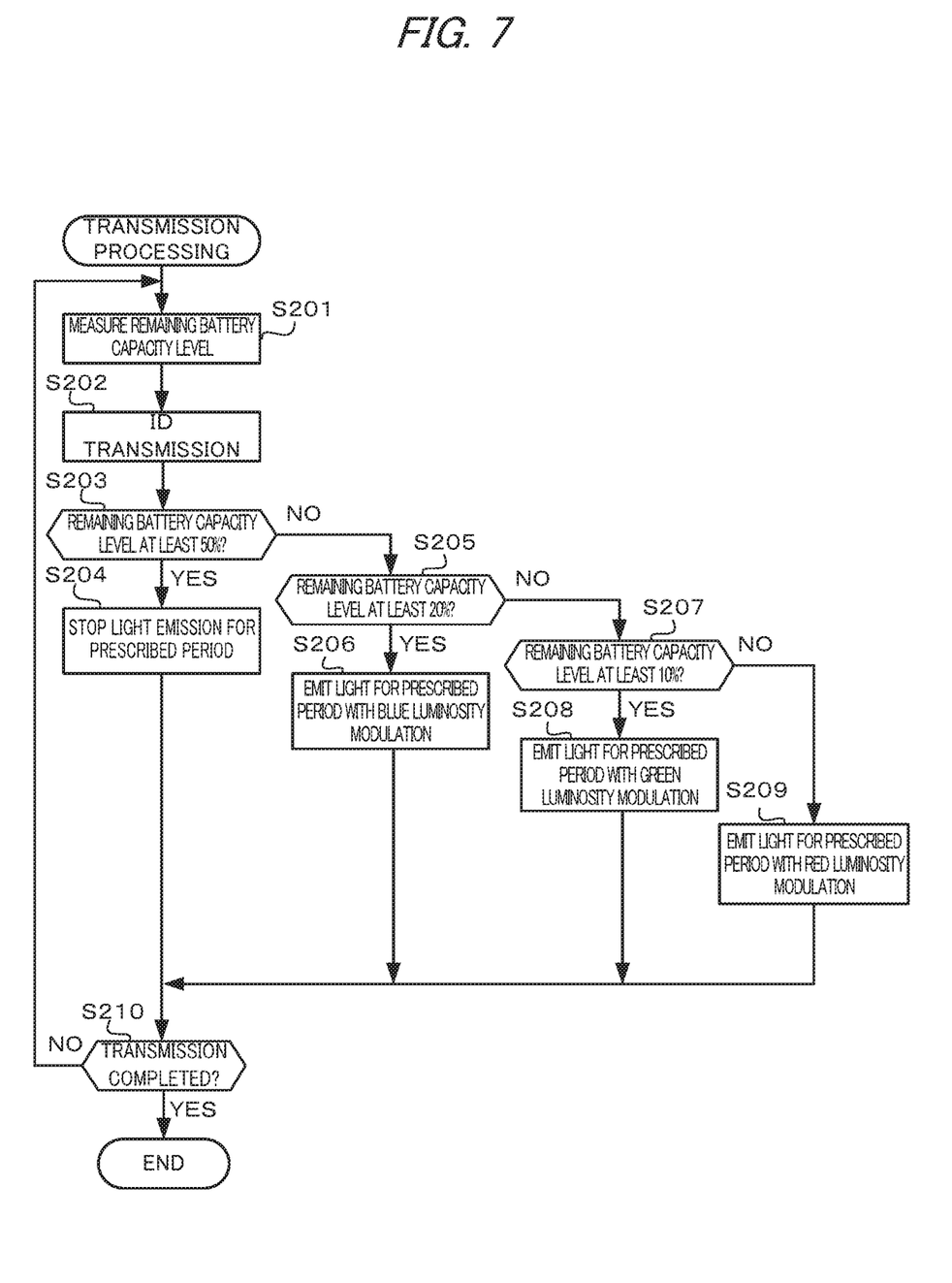
FIG. 7 is a flowchart illustrating another example of operation of transmission processing by the mobile apparatus according to the same embodiment.

FIG. 7 is a flowchart illustrating another example of operations of transmission processing according to the mobile apparatus 100 within the visible light communication system 1. The operations illustrated in FIG. 7 are an example in a case in which light emission is performed that corresponds to the second light-emission pattern illustrated in FIG. 4.

The remaining battery capacity measuring device 122 within the control device 103 of the mobile apparatus 100 measures the remaining battery capacity level of the battery 150, that is, the remaining battery capacity level (step S201). Thereafter, the light-emission control device 124 within the control device 103 outputs to the driver 112 information of the light-emission pattern corresponding to the ID of the mobile apparatus 100. The driver 112 generates the driver signal to cause the hue of the light emitted by the LED 102 to change time-wise to correspond to the information of the light-emission pattern corresponding to the ID from the light-emission control device 124. In response to the driver signal output from the driver 112, the LED 102 emits light that changes in hue time-wise so as to correspond to the ID, that is, performs ID transmission (step S202).

The light-emission control device 124 next determines whether the remaining battery capacity level is at least 50% (step S203). When the remaining battery capacity level is at least 50% (YES in step S203), the light-emission control device 124 performs control that stops light emission for a prescribed period (step S204). The stoppage of light emission for the prescribed period corresponds to the no-data period 302 that indicates that the remaining battery capacity level is at least 50%.

However, when the remaining battery capacity level is at least 50% (NO in step S203), the light-emission control device 124 determines whether the remaining battery capacity level is at least 20% (step S205). When the remaining battery capacity level is at least 20% (YES in step S205), that is, when the remaining battery capacity level is at least 20% and is less than 50%, the light-emission control device 124 outputs to the driver 112 information of the light-emission pattern that corresponds to light emission of the prescribed period by blue luminosity modulation that indicates that the remaining battery capacity level is at least 20% and is less than 50%. The driver 112 generates a driver signal that corresponds to light for emission by the LED 102 corresponding to the information of the light-emission pattern from the light-emission control device 124. In response to the driver signal output from the driver 112, the LED 102 performs light emission for a prescribed period by blue luminosity modulation that indicates that the remaining battery capacity level is at least 20% and is less than 50% (step S206).

However, when the remaining battery capacity level is not at least 20% (NO in step S205), the light-emission control device 124 determines whether the remaining battery capacity level is at least 10% (step S207). When the remaining battery capacity level is at least 10% (YES in step S207), that is, when the remaining battery capacity level is at least 10% and is less than 20%, the light-emission control device 124 outputs to the driver 112 information of the light-emission pattern corresponding to emission of light for a prescribed period by green luminosity modulation that indicates that the remaining battery capacity level is at least 10% and is less than 20%. The driver 112 generates the driver signal corresponding to light for emission by the LED 102 corresponding to the information of the light-emission pattern from the light-emission control device 124. In response to the driver signal output from the driver 112, the LED 102 performs the emission of light to the prescribed period by green luminosity modulation indicating that the remaining battery capacity level is at least 10% and is less than 20% (step S208).

However, when the remaining battery capacity level is less than 10% (NO in step S207), the light-emission control device 124 outputs to the driver 112 information of the light-emission pattern corresponding to emission of light of the prescribed period by red luminosity modulation that indicates that the remaining battery capacity level is less than 10%. In response to the information of the light-emission pattern from the light-emission control device 124, the driver 112 generates the driver signal that corresponds to the light for emission by the LED 102. In response to the driver signal output from the driver 112, the LED 102 performs the emission of light for the prescribed period by red luminosity modulation that indicates that the remaining battery capacity level is less than 10% (step S209).

After step S204, step S206, step S208, or step S209, the control device 103 determines whether the transmission by the mobile apparatus 100 is completed (step S210). Upon determination that the transmission by the mobile apparatus 100 is completed (YES in step S210), the series of operations ends. However, upon determination that the transmission by the mobile apparatus 100 is not completed (NO in step S210), the operations of step S201 and beyond are repeated.

Although the user can understand the remaining battery capacity level of the battery 150 by visually recognizing the light-emission mode of the LED 102 in the above-described embodiment, the receiver-side server 200 may understand the remaining battery capacity level of the battery 150 by understanding the light-emission mode of the LED 102.

Figure 8:
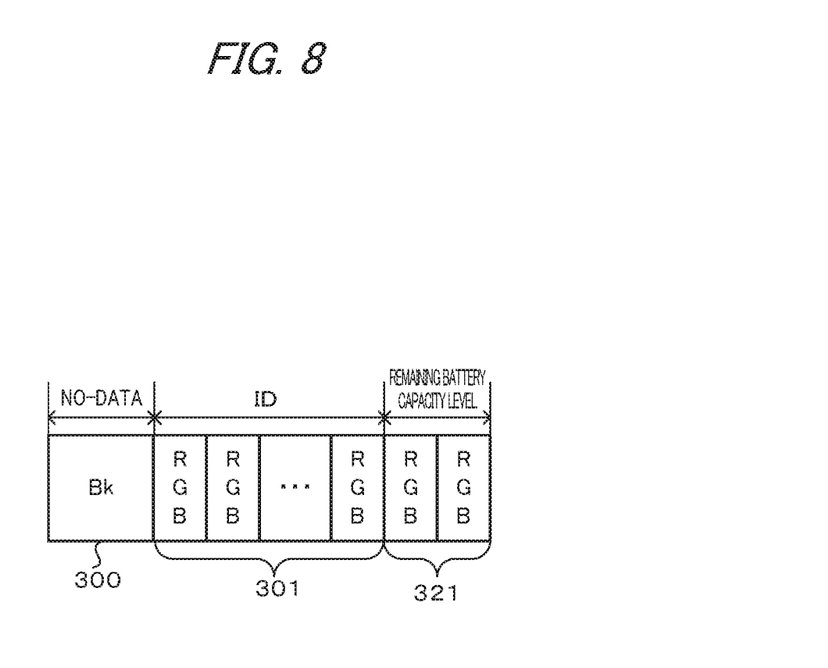
FIG. 8 illustrates an example of a third light-emission pattern according to the same embodiment.

FIG. 8 illustrates an example of a third light-emission pattern. The third light-emission pattern includes: a wireless signal (turn-off "Bk") as the header, light emission as red (R), green (G), or blue (B) of a certain count that corresponds to the ID, and light emission as red (R), green (G), or blue (B) of a certain count that corresponds to the remaining battery capacity level. Various types of modes can be considered for light emission that corresponds to the remaining battery capacity level. For example, the remaining battery capacity level can be indicated in three stages, such as "high", "low", and "discharged", and hue and/or luminosity can be set that corresponds to the three stages.

The remaining battery capacity measuring device 122 within the control device 103 of the mobile apparatus 100 measures the remaining battery capacity level of the battery 150. The light-emission control device 124 outputs to the driver 112 the information of the third light-emission pattern corresponding to the ID and the battery capacity of the mobile apparatus 100. In response to the information of the third light-emission pattern from the light-emission control device 124, the driver 112 generates the driver signal for causing time-wise change in the hue and/or luminosity of the light emitted by the LED 102. In response to the driver signal output from the driver 112, the LED 102 emits light that changes time-wise in hue and/or luminosity to correspond to the ID and the remaining battery capacity level.

The information acquirer 232 within the control device 202 of the server 200 identifies the light-emission pattern, of the LED 102 within the mobile apparatus 100, corresponding to the ID and/or the remaining battery capacity level. Further, the information acquirer 232 understands the remaining battery capacity level and the acquired ID corresponding to the identified light-emission pattern.

In the present embodiment in this manner, the mobile apparatus 100 controls the light-emission mode of the LED 102 so as to correspond to the remaining battery capacity level of the battery 150 contained therein. Specifically, the mobile apparatus 100, in a period different from the period of emission of light for sending the ID, in response to the remaining battery capacity level of the battery 150, performs operations such as changing of the hue of the light emitted by the LED 102, setting the no-data and the no-data period. Alternatively, the mobile apparatus 100, in the period different from the period of emission of light for sending the ID, changes the luminosity of the light emitted by the LED 102 in response to the remaining battery capacity level of the battery 150. Due to such operation, without impeding the transmission of the ID, notification of the remaining battery capacity level can be sent, the user can visually recognize the light-emission mode of the LED 102 and thus can understand the remaining battery capacity level of the battery 150.

Moreover, in the present embodiment, due to the mobile apparatus 100 setting of the period for emission of light for transmitting notification of the remaining battery capacity level of the battery 150 to the user to a period different from the period of emission of light for transmitting the ID of the mobile apparatus 100, the impeding of transmission of the ID is prevented. Moreover, due to the mobile apparatus 100 setting the period for emission of light for transmitting notification of the remaining battery capacity level of the battery 150 to the user to the period different from the period of no-data that corresponds to the header for synchronization, or setting so that the period for emission of light for transmitting such notification can be jointly used with the period of no-data that corresponds to the header for synchronization, loss of synchronization on the receiving side is prevented.

Moreover, in the present embodiment, when the remaining battery capacity level is low as illustrated in FIG. 3E, the period indicating the remaining battery capacity level is the no-data period, and the period of this no-data is further prolonged in comparison to cases such as that of FIG. 3A. Due to such operation, the ID transmission cycle is prolonged, thereby enabling suppression of power consumption in response to the low remaining battery capacity level.

Moreover, in the present embodiment, the emission of light that corresponds to the remaining battery capacity level is monochromatic light emission, and thus intermixing with other information such as the ID is prevented at the receiving side.

Further, the present disclosure is not limited to the description and drawings of the aforementioned embodiments, and appropriate modifications are possible to the aforementioned embodiments and drawings.

For example, although the transmission frequency of the remaining battery capacity level is not limited in the aforementioned embodiments, the mobile apparatus 100 may perform transmission at a prescribed frequency such as transmission for 30 seconds within a 1 hour period. Moreover, after transmission once or multiple times, repeated transmission by the mobile apparatus 100 may be omitted until a change occurs in the state of the remaining battery capacity level.

Moreover, the light-emission modes that correspond to the remaining battery capacity level are not limited to the modes described in the aforementioned embodiments. For example, when the remaining battery capacity level is low, the mobile apparatus 100 may perform control of the emission of light by lowering luminosity in order to suppress power consumption. Furthermore, in response to the remaining battery capacity level, notification may be sent to the user by changing the light-emission period 301 in a staged manner.

Moreover, although the information that is the transmission target for the mobile apparatus 100 in the aforementioned embodiments is the ID of the mobile apparatus 100, this configuration is not limiting, and this information may be positional information of the mobile apparatus 100, a fault occurring in the mobile apparatus 100, or the like.

Moreover, although a case is described in the aforementioned embodiments in which visible light that is red-, green-, or blue-colored is used for communication, visible light of another color may be used. Further, the emission of light is not limited to time-wise change of the hue and/or the luminosity, and color saturation may be changed in a time-wise manner.

Moreover, the light source within the mobile apparatus 100 is not necessarily an LED. For example, the light source may include part of an LCD, a PDP, an EL display, or the like included in a display device.

Moreover, the server 200 may be any device that is equipped with an imager and is capable of imaging.

Further, an executable program on a computer-readable recording medium such as a flexible disc, compact disc read-only memory (CD-ROM), digital versatile disc (DVD), magneto-optical (MO) disc, and the like may be distributed, and the program may be installed to form a system that executes the aforementioned processing in the aforementioned embodiments.

Further, the program may be stored on a disc device or the like of a certain server on a communication network such as the Internet and, for example, may be superimposed on carrier waves and downloaded, or the like.

Moreover, in the case of realization of the aforementioned functions by execution allocated to an operating system (OS) or by execution in cooperation between the OS and an application, performance of the containing and distributing of the aforementioned recording medium, or downloading or the like, for the non-OS portion alone is permissible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A transmitting device comprising:
    a light emitter; and
    a processor configured to
        transmit specific information by causing the light emitter to emit, at a first cyclic light-emission timing, light that is modulated using the specific information that is set in advance in the transmission device,
        acquire a state of the transmitting device that changes time-wise during transmission of the specific information, and
        control the light emitter to emit light, at a second light-emission timing different from a period of light emission at the first cyclic light-emission timing, corresponding to information of the acquired state of the transmitting device that changes time-wise.

2. The transmitting device according to claim 1, wherein
    the information indicating the state of the transmitting device that changes time-wise includes a plurality of stages, and
    upon acquiring of the state of the transmitting device that changes time-wise, the processor determines which of the stages the state is in, and controls the light emitter to emit light corresponding to the determined stage.

3. The transmitting device according to claim 2, further comprising: a battery, wherein
    the state of the transmitting device that changes time-wise includes a remaining battery capacity level of the battery, and
    the processor controls the light emitter to emit light corresponding to a stage of the acquired remaining battery capacity level of the battery.

4. The transmitting device according to claim 1, wherein
    the processor controls the light emitter so that the light emitter emits light modulated in a wavelength region of visible light based on the information of the acquired state of the transmitting device that changes time-wise.

5. A transmission method comprising:
transmitting specific information by causing a light emitter to emit, at a first cyclic light-emission timing, light that is modulated using the specific information that is set in advance in a transmission device that comprises the light emitter;
acquiring a state of the transmitting device that changes time-wise during transmission of the specific information; and
controlling the light emitter to emit light, at a second light-emission timing different from a period of light emission at the first cyclic light-emission timing, corresponding to information of the acquired state of the transmitting device that changes time-wise.

6. The transmission method according to claim 5, wherein
the information indicating the state of the transmitting device that changes time-wise includes a plurality of stages,
the method further comprises, upon acquiring the state of the transmitting device that changes time-wise, determining which of the stages the state is in, and
the controlling of the light emitter controls the light emitter to emit light corresponding to the determined stage.

7. The transmission method according to claim 6, wherein
the transmitting device further comprises a battery,
the state of the transmitting device that changes time-wise includes a remaining battery capacity level of the battery, and
the controlling of the light emitter controls the light emitter to emit light corresponding to a stage of the acquired remaining battery capacity level of the battery.

8. The transmission method according to claim 5, wherein
the controlling of the light emitter controls the light emitter to modulate a visible light wavelength region of the light based on the information of the acquired state of the transmitting device that changes time-wise, and to emit the modulated light.

9. A non-transitory computer-readable recording medium for recording a program for causing a computer included in a transmitting device to function as:
transmission means for transmitting specific information by causing a light emitter included in the transmitting device to emit, at a first cyclic light-emission timing, light that is modulated using the specific information that is set in advance in the transmission device;
acquisition means for acquiring a state of the transmitting device that changes time-wise during transmission of the specific information by the transmission means; and
control means for controlling the light emitter to emit light, at a second light-emission timing different from a period of light emission at the first cyclic light-emission timing, corresponding to information of the state of the transmitting device that changes time-wise and is acquired by the acquisition means.

10. The non-transitory computer-readable recording medium according to claim 9, wherein
the information indicating the state of the transmitting device that changes time-wise includes a plurality of stages,
the program causes the computer to, upon acquiring of the state of the transmitting device that changes time-wise, function as determination means for determining which stage the state is in, and
the control means controls the light emitter to emit light corresponding to the determined stage.

11. The non-transitory computer-readable recording medium according to claim 10, wherein
the transmitting device further comprises a battery,
the state of the transmitting device that changes time-wise includes a remaining battery capacity level of the battery, and
the control means controls the light emitter to emit light corresponding to a stage of the acquired remaining battery capacity level of the battery.

12. The non-transitory computer-readable recording medium according to claim 9, wherein
the control means controls the light emitter to modulate the light in a wavelength region of visible light occurring in the light based on the acquired state of the transmitting device that changes time-wise, and to emit the modulated light.

* * * * *